(12) United States Patent
Oike

(10) Patent No.: US 10,605,408 B2
(45) Date of Patent: Mar. 31, 2020

(54) STEAM TRAP MONITORING SYSTEM, PIPE COLLECTION DEVICE, AND STEAM TRAP UNIT

(71) Applicant: TLV Co., Ltd., Kakogawa-shi (JP)

(72) Inventor: Tadashi Oike, Kakogawa (JP)

(73) Assignee: TLV Co., Ltd., Hyogo (JP)

( * ) Notice: Subject to any disclaimer, the term of this patent is extended or adjusted under 35 U.S.C. 154(b) by 0 days.

(21) Appl. No.: 15/517,743

(22) PCT Filed: Jul. 28, 2015

(86) PCT No.: PCT/JP2015/071344
§ 371 (c)(1),
(2) Date: Apr. 7, 2017

(87) PCT Pub. No.: WO2016/056292
PCT Pub. Date: Apr. 14, 2016

(65) Prior Publication Data
US 2017/0299117 A1   Oct. 19, 2017

(30) Foreign Application Priority Data

Oct. 10, 2014   (JP) ................................. 2014-209135

(51) Int. Cl.
*F16T 1/38*   (2006.01)
*F16T 1/48*   (2006.01)
*F16T 1/00*   (2006.01)
*F16T 1/02*   (2006.01)

(52) U.S. Cl.
CPC .. F16T 1/48 (2013.01); F16T 1/02 (2013.01)

(58) Field of Classification Search
CPC ..... F16T 1/00; F16T 1/38; F16T 1/383; F16T 1/386; F16T 1/48
USPC ................ 137/171, 177, 181, 269, 270, 271
See application file for complete search history.

(56) References Cited

U.S. PATENT DOCUMENTS

| 5,579,805 | A | * | 12/1996 | Alain | ........................ F16T 1/38 137/606 |
| 5,687,755 | A | | 11/1997 | Farquhar et al. | |
| 5,881,766 | A | * | 3/1999 | Schlesch | ................... F16T 1/38 137/182 |
| 5,947,145 | A | * | 9/1999 | Schlesch | ................... F16T 1/38 137/182 |
| 6,728,659 | B1 | | 4/2004 | Nguyen et al. | |

(Continued)

FOREIGN PATENT DOCUMENTS

FR   2595822 A1   9/1987
GB   2459319 A   10/2009
(Continued)

*Primary Examiner* — Marina A Tietjen
*Assistant Examiner* — Paul J Gray
(74) *Attorney, Agent, or Firm* — The Webb Law Firm

(57) ABSTRACT

A steam trap monitoring system includes: a steam trap; an opening/closing valve for opening/closing a channel to the steam trap, the opening/closing valve being located on upstream side of the steam trap; a sensor for detecting one or more physical quantities; and an analysis unit for analyzing detection information from the sensor. In this steam trap monitoring system, the analysis unit is configured to analyze both a functional state of the steam trap and a functional state of the opening/closing valve, based on detection information from the single sensor.

14 Claims, 11 Drawing Sheets

(56) References Cited

U.S. PATENT DOCUMENTS

| | | |
|---|---|---|
| 8,573,250 B1 | 11/2013 | Radle et al. |
| 2006/0118648 A1* | 6/2006 | Armstrong ................ F16T 1/48 |
| | | 236/93 R |
| 2011/0036424 A1* | 2/2011 | Oike ................... F16K 37/0075 |
| | | 137/551 |
| 2011/0316707 A1 | 12/2011 | Gaines et al. |
| 2013/0153042 A1* | 6/2013 | Young ..................... F23N 1/005 |
| | | 137/14 |
| 2013/0173178 A1* | 7/2013 | Poczka ............... G01M 3/2807 |
| | | 702/24 |

FOREIGN PATENT DOCUMENTS

| JP | 1210700 A | 8/1989 |
|---|---|---|
| JP | 3110436 A | 5/1991 |
| JP | 4111998 U | 9/1992 |
| JP | H10252987 A | 9/1998 |
| JP | 1137391 A | 2/1999 |
| JP | 201160269 A | 3/2011 |
| JP | 2012127432 A | 7/2012 |

\* cited by examiner

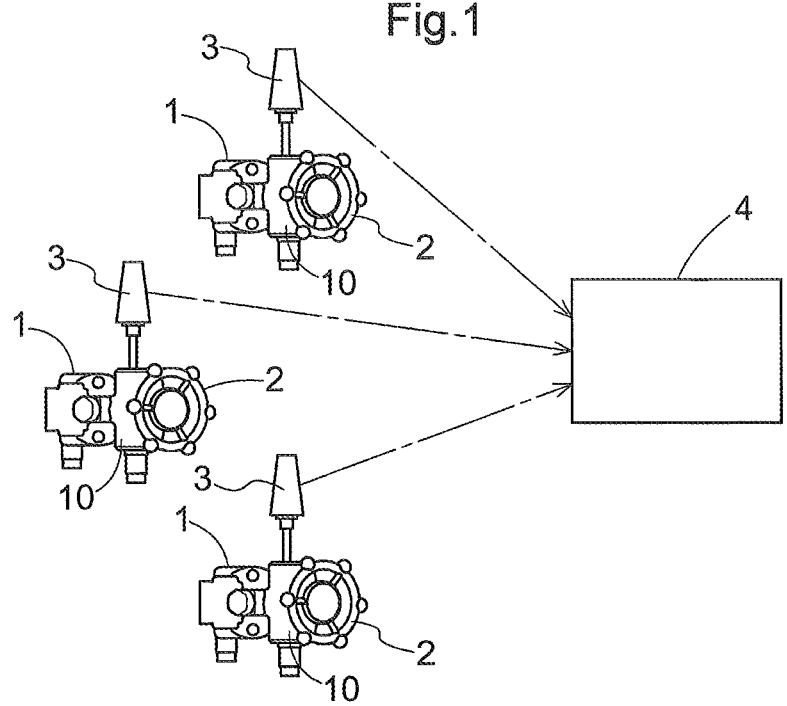
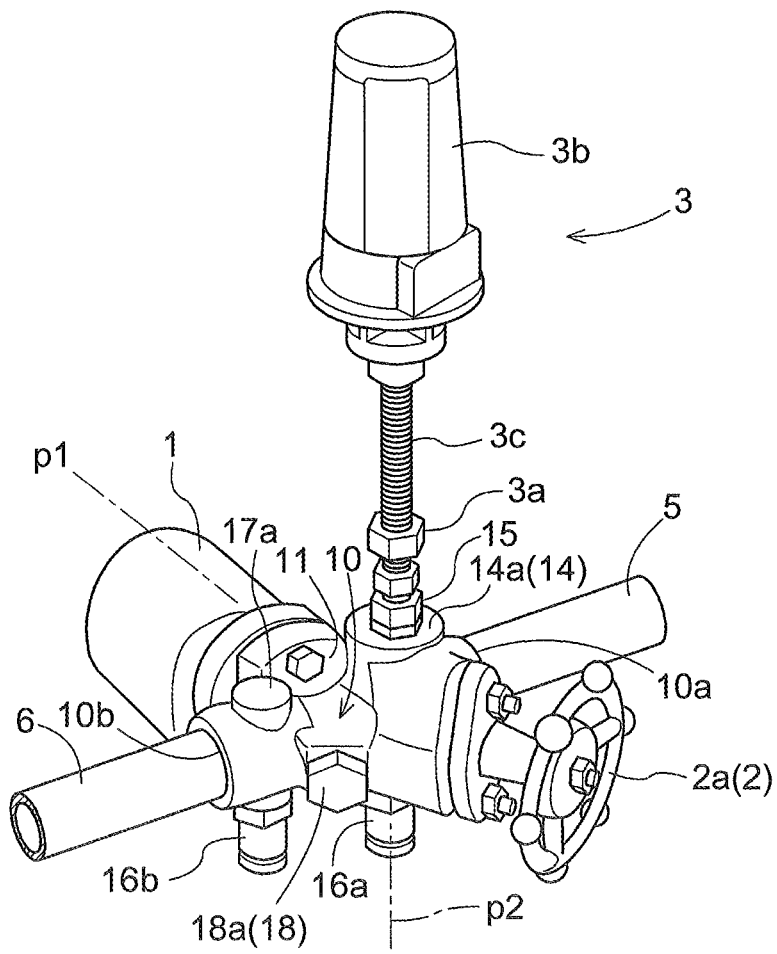

STEAM TRAP MONITORING SYSTEM, PIPE COLLECTION DEVICE, AND STEAM TRAP UNIT

CROSS-REFERENCE TO RELATED APPLICATIONS

This application is the United States national phase of International Application No. PCT/JP2015/071344 filed Jul. 28, 2015, and claims priority to Japanese Patent Application No. 2014-209135 filed Oct. 10, 2014 the disclosures of which are hereby incorporated in their entirety by reference.

TECHNICAL FIELD

The present invention relates to a steam trap monitoring system. More particularly, the invention relates to a steam trap monitoring system having a steam trap, an opening/closing valve disposed on upstream side of the steam trap and configured to open/close a channel to the steam trap, a sensor for detecting one or more physical quantities, and an analysis unit for analyzing detection information from the sensor. The invention relates also to a pipe collection device using the system as well as a steam trap unit usable in such steam trap monitoring system.

BACKGROUND ART

In order to prevent entry of steam at time of e.g. repair or replacement of a steam trap, an opening/closing valve needs to be disposed on upstream side (entrance side) of the steam trap. In monitoring the steam trap, it is necessary to monitor not only whether the steam trap is functioning appropriately or not, but also a functional state of the opening/closing valve. e.g. for checking whether steam is leaking to the steam trap when the opening/closing valve is closed for stopping entry of steam to the steam trap. And, conventionally, for the sake of monitoring respective functional states of the steam trap and the opening/closing valve, sensors would be attached to the steam trap and for the opening/closing valve, respectively, and based on detection information of the respective sensors, the functional states of the steam trap and the opening/closing valve would be analyzed separately (see Patent Document 1 respecting the steam trap and see Patent Document 2 respecting the opening/closing valve).

PRIOR ART DOCUMENTS

Patent Documents

Patent Document 1: Japanese Unexamined Patent Application Publication Hei. No. 1-210700
Patent Document 2: Japanese Unexamined Patent Application Publication Hei. No. 3-110436

SUMMARY

Problem to be Solved by Invention

However, with the above-described system, since a sensor is provided respectively for both a steam trap and an opening/closing valve, the system would suffer problem of high cost. In particular, for the steam trap and the opening/closing valve, a great number of them will generally be provided in a steam plant. Thus, there would be problems of device structure complexity and high device cost.

Further, in the case of an arrangement wherein detection information obtained by a sensor is transmitted wirelessly to a central management device for analysis of this sensor detection information therein, when the detection information is transmitted to the central management device, communication trouble would tend to occur due to communication interference/disturbance between the sensors in case many such sensors are provided.

In view of the above-described state of the art, the principal object of this disclosure lies in resolving the above-described problem by enabling analysis of respective functional states of the steam trap and the opening/closing valve while reducing the number of sensors.

Solution

A steam trap monitoring system relating to this disclosure comprises:
a steam trap;
an opening/closing valve disposed on upstream side of the steam trap and configured to open/close a channel to the steam trap;
a sensor for detecting one or more physical quantities: and
an analysis unit for analyzing detection information from the sensor;
wherein the analysis unit is configured to analyze both a functional state of the steam trap and a functional state of the opening/closing valve, based on detection information from the single sensor.

With the above-described arrangement, since both a functional state of the steam trap and a functional state of the opening/closing valve are analyzed via the single sensor; thus, as compared with the arrangement wherein a sensor is provided respectively for both the steam trap and the opening/closing valve for analysis of the functional states thereof, the number of sensors to be provided can be reduced effectively, whereby the device structure can be made simple and device cost can be reduced effectively. Furthermore, the communication trouble disturbance to increased number of sensors can be effectively avoided.

Next, preferred modes of embodying the steam trap monitoring system relating to this disclosure will be explained. It is understood however that the scope of the present disclosure is not to be limited in any way by these preferred modes of embodiments described next.

According to one preferred mode of embodiment, the sensor comprises a vibration sensor for detecting vibration that propagates adjacent the steam trap and the opening/closing valve.

Namely, vibration that propagates adjacent the steam trap and the opening/closing valve reflects mainly the functional state of the steam trap (e.g. whether steam leak is occurring or not), when the opening/closing valve is opened. On the other hand, when the opening/closing valve is closed, entry of steam to the steam trap is stopped, so that no vibration occurs from the steam trap. Also, when the opening/closing valve effects its closing action normally, no vibration occurs from this opening/closing valve, either. Conversely, if the opening/closing valve is not effecting its closing action normally, steam leak will occur at the opening/closing valve, which leads to generation of vibration due to this steam leak. For this reason, according to the above-described arrangement, when the opening/closing valve is under its opened state, the sensor detects vibration if any that reflects the functional state of the steam trap, whereby the functional state of the steam trap can be analyzed. On the other hand, when the opening/closing valve is under its closed state, it is possible to analyze the functional state of the opening/closing valve (whether it is effecting its closing operation normally or not) based on presence/absence of vibration. In this way, both the functional state of the steam trap and the functional state of the opening/closing valve can be analyzed appropriately.

According to a further mode of embodiment, preferably, the sensor further comprises a temperature sensor.

For instance, if clogging occurs in the steam trap, this will lead to accumulation of condensate in the steam trap, which will in turn lead to drop of the temperature inside the steam trap and subsequent drop of temperatures adjacent the steam trap and the opening/closing valve. In this way, when the opening/closing valve is under its opened state, the temperature adjacent the steam trap and the opening/closing valve reflects the temperature inside the steam trap. For this reason, according to the above-described arrangement, with detection of the temperature adjacent the steam trap and the opening/closing valve by a temperature sensor, analysis via temperature is carried out in addition to the analysis based on vibration. Thus, as compared with the case of effecting only analysis based on vibration, the functional state of the steam trap can be analyzed in a more comprehensive manner.

According to one preferred mode of embodiment:

the steam trap is connected to a connection block having an entrance-side pipe connection port and an exit-side pipe connection port which are open in opposite directions from each other, in such a manner that the steam trap is communicated to the entrance-side connection port and the exit-side connection port via an entrance-side inner channel and an exit-side inner channel formed in this connection block;

the opening/closing valve is provided in the connection block in such a manner to be able to open/close the entrance-side inner channel formed in the connection block;

the sensor is provided in the connection block on an upstream side of the steam trap; and the connection block, the steam trap, the opening/closing valve and the sensor, thus, together constitute a single unit.

With the above-described arrangement, as the connection block, the steam trap, the opening/closing valve and the sensor are provided as a single unit, the device structure can be simple. Further, if the steam trap and the opening/closing valve were disposed at separate locations via piping, this would require positioning the sensor at a location that allows analysis of the functional state of the steam trap and the functional state of the opening/closing valve. On the other hand, with the above-described arrangement, it is readily possible to realize close-vicinity layout of the sensor relative to the steam trap and the opening/closing valve, so that this sensor can appropriately detect physical quantity reflecting the functional states of the steam trap and the opening/closing valve. As a result, both the functional state of the steam trap and the functional state of the opening/closing valve can be analyzed in an even easier and more appropriate manner.

And, in the case of repair/replacement of the steam trap, the steam trap can be removed from the connection block with keeping the connection between piping and the connection block as well as the attachment of the sensor to the connection block. In this respect, the system can be advantageous also in the respect of maintenance such as inspection/repair.

According to one preferred mode of embodiment:

the connection block is configured to be attachable to a pipe to be installed under a posture with the entrance-side pipe connection port and the exit-side pipe connection port being inverted left and right in their positions by upside-down inversion through rotation of the connection block about a front-rear axis extending perpendicularly to the pipe;

the opening/closing valve has an operating portion disposed at a front face portion of the connection block;

a sensor attaching portion for attachment of the sensor by insertion thereof including an upper face side sensor attaching part provided in the upper face portion of the connection block and a lower face side sensor attaching part provided in a lower face portion of the connection block is provided on an upstream side of the steam trap in the connection block; and for the connection block that is attached to the pipe without the upside-down inversion, the sensor is attached to the upper face side sensor attaching part, whereas for the connection block that is attached to the pipe with the upside-down inversion, the sensor is attached to the lower face side sensor attaching part.

When the left-right positional relationship (i.e. which is the right side or the left side) between the entrance side pipe and the exit side pipe is inverted, this normally will require left-right orientation inversion of the connection block also. However, if such left-right inversion is implemented by upside-down inversion through rotation of the connection block about a front-rear axis extending perpendicularly to the pipe, the upside-down orientation of the sensor is inverted upside/down in association with the left-right orientation inversion of the connection block. And, if the left-right inversion is implemented by the left-right inversion by way of the rotation about the upside-down axis perpendicular to the pipes, the operating portion of the opening/closing valve will be caused to face the rear side in association with the left-right orientation inversion of the connection block. However, for the sensor, due to requirement relating to communication and/or requirement relating to disposing space, it is preferred that this sensor be attached to the upper face of the connection block; and for the operating portion of the opening/closing valve, for requirement relating to its operation, it is preferred that this operating portion face the front side of the connection block. Therefore, the orientations of the sensor and the operating portion of the opening/closing valve should remain unchanged even when the left-right orientation of the connection block is inverted.

Then, with the above-described arrangement, as the left-right orientation inversion of the connection block is implemented by the upside-down inversion resulting from rotation about the front-rear axis perpendicular to the pipes, in association with the left-right orientation inversion of the connection block with the operating portion of the opening/closing valve facing the front side of the connection block, the sensor is attached to the lower face side sensor attaching part caused to face substantially the upper side due to the upside-down inversion. Thus, the sensor can be attached substantially to the upper face portion of the connection block. In this way, the orientations of the sensor and the operating portion of the opening/closing valve can be same.

As described above, the arrangement is provided such that the connection block can be attached in a same manner even when it is attached to the pipes with left-right switchover between the position of the entrance side pipe connection port and the exit side pipe connection port due to upside-down inversion thereof. This arrangement can eliminate need to manufacture two kinds of connection blocks having the positions of their entrance-side pipe connection port and exit-side pipe connection port being inverted left and right from each other. Thus, there is achieved further advantage in terms of device cost.

According to one preferred mode of embodiment:

the sensor attaching portion is configured to establish communication from a surface of the connection block to an inner channel of the connection block; and a cover is provided at an insertion portion of the sensor to the sensor attaching portion, so that the sensor, when inserted, keeps out of contact with fluid flowing in the inner channel of the connection block.

With the above-described arrangement, deterioration of the sensor resulting from its contact with the fluid (steam and/or condensate) is prevented, whereby cost required for repair or replacement of the sensor can be effectively suppressed.

According to one preferred mode of embodiment:

for the connection block which is attached to the pipe without the upside-down inversion, a blowdown valve for opening the inside of the connection block to the atmosphere is attached to the lower face side sensor attaching part; and for the connection block which attached to the pipe with the upside-down inversion, the blowdown valve is attached to the upper face side sensor attaching part.

With the above-described arrangement, the blowdown valve is attached with utilization of one of the upper face side sensor attaching part and the lower face side sensor attaching part, which one sensor attaching part is located substantially in the lower face of the connection block and the sensor is not attached thereto. Thus, it is possible to eliminate need to form dedicated blowdown valve attaching parts respectively in the upper face portion and the lower face portion of the connection block, separately from the upper face side sensor attaching part and the lower face side sensor attaching part. With this, the structure of the connection block can be made simple, and also further device cost reduction is made possible.

According to one preferred mode of embodiment:

the sensor attaching portion is configured to not establish communication from a surface of the connection block to an inner channel of the connection block, to keep the sensor, when inserted, out of contact with fluid flowing in the inner channel of the connection block.

With the above-described arrangement, deterioration of the sensor resulting from its contact with the fluid (steam and/or condensate) is prevented, whereby cost required for repair or replacement of the sensor can be effectively suppressed.

According to one preferred mode of embodiment:

in addition to the opening/closing valve, there is provided an exit-side opening/closing valve disposed on a downstream side of the steam trap and configured to open/close the channel to the steam trap.

With the above-described arrangement, both the upstream side channel and the downstream side channel for the steam trap can be closed by the (entrance side) opening/closing valve and the exit-side opening/closing valve. With this arrangement, at the time of repair/replacement of the steam trap, entry of fluid such as steam to the steam trap can be prevented in a more reliable manner than the arrangement wherein only the upstream side channel is closed by the (entrance side) opening/closing valve.

A pipe collection device according to the present disclosure in which a plurality of horizontally oriented branch pipes are connected to a vertically oriented main pipe, with the branch pipes being connected parallel with each other and distributed vertically;

wherein the steam trap monitoring system of any one of the arrangements described above is applied to each of the branch pipes.

With the above-described arrangement, the steam trap monitoring system capable of analyzing both a functional state of the steam trap and a functional state of the opening/closing valve by the single sensor provided for the two devices, i.e. the steam trap and the opening/closing valve is applied to a pipe collection device whose device configuration would otherwise tend to be complicated with provision of not only pipes, but also, the steam trap, the opening/closing valve, etc. Therefore, in comparison with an arrangement wherein a sensor 3 is provided respectively for both the steam trap 1 and the opening/closing valve 2, the number of sensors required can be reduced, whereby the whole device configuration can be made simple.

A steam trap unit according to the present disclosure comprises:

a steam trap;

a connection block having an entrance-side pipe connection port and an exit-side pipe connection port which are open in opposite directions from each other;

an opening/closing valve configured to open/close a channel to the steam trap; and a sensor for detecting one or more physical quantities:

wherein the steam trap is connected to the connection block in such a manner that the steam trap is communicated to the entrance-side connection port and the exit-side connection port via an entrance-side inner channel and an exit-side inner channel formed in this connection block;

the opening/closing valve is provided in the connection block in such a manner to be able to open/close the entrance-side inner channel formed in the connection block; and the sensor is provided in the connection block on an upstream side of the steam trap.

According to one preferred mode of embodiment:

the connection block is configured to be attachable to a pipe to be installed under a posture with the entrance-side pipe connection port and the exit-side pipe connection port being inverted left and right in their positions by upside-down inversion through rotation of the connection block about a front-rear axis extending perpendicularly to the pipe;

the opening/closing valve has an operating portion disposed at a front face portion of the connection block;

a sensor attaching portion for attachment of the sensor by insertion thereof including an upper face side sensor attaching part provided in the upper face portion of the connection block and a lower face side sensor attaching part provided in a lower face portion of the connection block is provided on an upstream side of the steam trap in the connection block; and for the connection block that is attached to the pipe without the upside-down inversion, the sensor is attached to the upper face side sensor attaching part, whereas for the connection block that is attached to the pipe with the upside-down inversion, the sensor is attached to the lower face side sensor attaching part.

BRIEF DESCRIPTION OF THE DRAWINGS

FIG. 1 is a schematic view of a steam trap monitoring system,

FIG. 2 is a perspective view of a connection block,

EMBODIMENTS

FIG. 1 shows one example of a steam trap monitoring system relating to this disclosure. This steam trap monitoring system is constituted of a connection block 10 having a steam trap 1, a piston valve (opening/closing valve) 2 and a sensor 3, and an analysis device (corresponding to an "analysis unit") 4 for analyzing detection information from the sensor 3.

Figure 3:
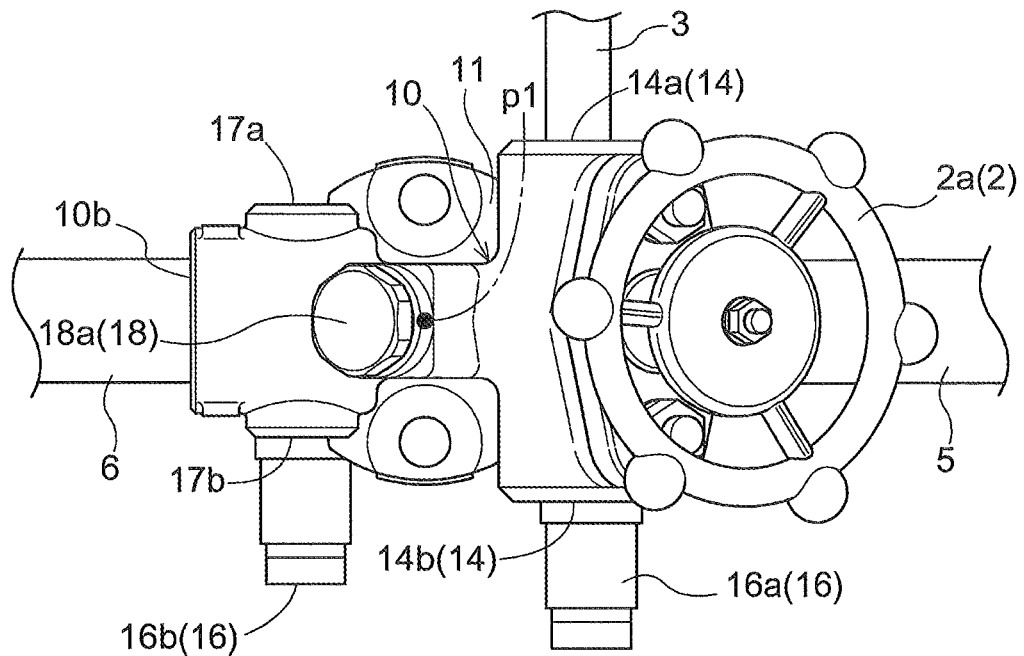
FIG. 3 is a front view of the connection block.
Figure 4:
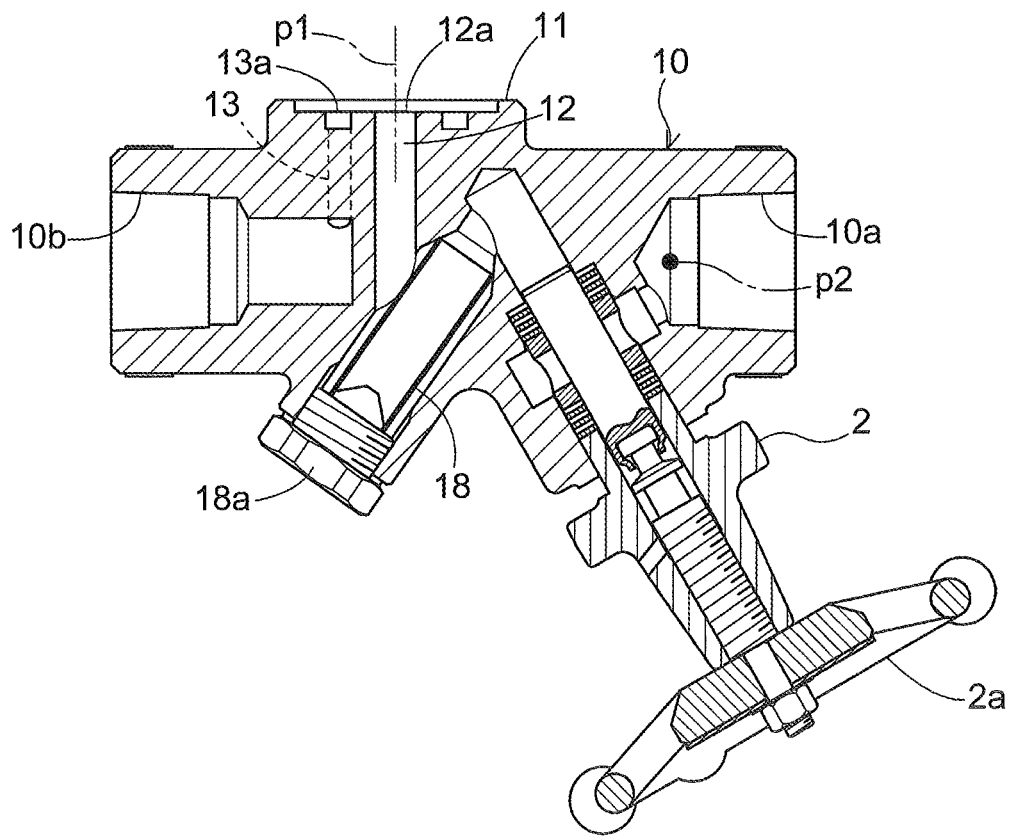
FIG. 4 is a vertical section view of the connection block.

As shown in FIGS. 2, 3 and 4, the connection block 10 defines entrance-side and exit-side pipe connection ports 10a, 10b which are coaxial and open in directions opposite to each other. The entrance-side pipe connection port 10a is connected to an entrance-side pipe 5 for guiding mixture fluid of steam and condensate, such as a condensate discharge channel of a steam using device; whereas, the exit-side pipe connection port 10b is connected to an exit-side pipe 6 as a condensate pipe for feeding condensate back to e.g. a boiler.

Further, in a rear face portion of the connection block 10, a trap attaching seat 11 is formed, and the steam trap 1 is attached to this trap attaching seat 11. In the trap attaching seat 11, there are apertured trap connection ports 12a, 13a respectively for an entrance-side inner channel 12 and an exit-side inner channel 13, which are formed in the connection block 10. The steam trap 1 as attached to the trap attaching seat 11 is communicated to the entrance-side pipe connection port 10a of the connection block 10 via the entrance-side inner channel 12 and also communicated to the exit-side pipe connection port 10b in the connection block 10 via the exit-side inner channel 13.

In operation, the mixture fluid of steam and condensate flown into the entrance-side pipe 5 enters from the entrance-side pipe connection port 10a of the connection block 10 through the entrance-side inner channel 12 into the steam trap 1. Then, condensate separated from steam in the steam trap 1 is sent from the steam trap 1 through the exit-side inner channel 13 and the exit-side pipe connection port 10b of the connection block 10 into the exit-side pipe 6. Namely, of the mixture fluid of steam and condensate entering the entrance-side pipe 5, passage of steam is prevented by the steam trap 1 and condensate alone is returned to e.g. the boiler via the exit-side pipe 6.

Further, the trap connection port 12a of the entrance-side inner channel 12 is opened at the center of the trap attaching seat 11. On the other hand, the trap connection port 13a of the exit-side inner channel 13 is opened in the trap attaching seat 11 in an annular groove arrangement centering about the trap connection port 12a of the entrance-side inner channel 12.

Namely, the steam trap 1 can be attached to the trap attaching seat 11 with appropriate communication to the trap connection ports 12a, 13a respectively of the entrance-side inner channel 12 and the exit-side inner channel 13, even when the steam trap 11 assumes a posture realized with upside-down orientation inversion thereof by being rotated 180 degrees about a front-rear axis p1 which extends through the center of the trap attaching seat 11.

The piston valve 2 is provided integrally with the connection block 10 in such a manner as to open/close the entrance-side inner channel 12 of this connection block 10. An operating portion 2a of the entrance-side piston valve 2 projects obliquely forwardly under a horizontal posture from the front face portion of the connection block 10.

The sensor 3 is inserted and attached to a sensor attaching portion 14 provided on the entrance side of the connection block 10. More particularly, the sensor attaching portion 14 consists of a dual-use attaching port 14a formed in the upper face portion of the connection block 10 and a dual-use attaching port 14b formed in the lower face portion of the connection block 10 in vertical symmetric layout relative to the dual-use attaching port 14a. The dual-use attaching ports 14a, 14b respectively are communicated from the surface of the connection block 10 to the entrance-side inner channel 12. Further, as shown in FIG. 4, the dual-use attaching ports 14a, 14b, as seen in a plane view, are disposed with a center axis p2 of these dual-use attaching ports 14a, 14b being located at a position extending through an upstream vicinity of the piston valve 2.

In this way, in this steam trap monitoring system, the connection block 10, the steam trap 1, the piston valve 2 and the sensor 3 are configured to form a single steam trap unit, thus presenting a simple device structure.

Incidentally, in FIG. 2, the sensor 3 is attached to the dual-use attaching port 14a formed in the upper face portion of the connection block 10, with a sensor attaching sheath pipe 15 (corresponding to a 'cover') being inserted into this dual-use attaching port 14a from above, and then the sensor 3 is inserted into this sensor attaching sheath pipe 15 from above. Further, the dual-use attaching port 14b in the lower face portion of the connection block 10 is used as a blowdown valve attaching portion, so that a blowdown valve 16a for opening the entrance-side inner channel 12 to the atmosphere when necessary is attached to this dual-use attaching port 14b.

Also, on the exit side of the connection block 10 too, in order to allow attachment of a blowdown valve 16b for opening the exit-side inner channel 13 to the atmosphere when necessary, a dual-use attaching port 17a is formed in the upper face portion of the connection block 10, and a dual-use attaching port 17b is formed in the lower face portion of the connection block 10 in vertical symmetric layout relative to the dual-use attaching port 17a. Incidentally, the dual-use attaching ports 17a, 17b respectively are communicated from the surface of the connection block 10 to the exit-side inner channel 13. And, in the illustration of FIG. 2, as for the dual-use attaching port 17a in the upper face portion of the connection block 10, this port 17a is closed with a plug or the like, whereas the blowdown valve 16b is attached to the dual-use attaching port 17b in the lower face portion of the connection block 10.

In the connection block 10, a straightener 18 is provided integrally. This straightener 18 is disposed in the entrance-side inner channel 12 and between the piston valve 2 and the trap connection port 12a. A screen insertion/removal portion 18a of the straightener 18 is disposed on more exit side than the piston valve 2 and in the front face portion of the connection block 10.

Figure 5:
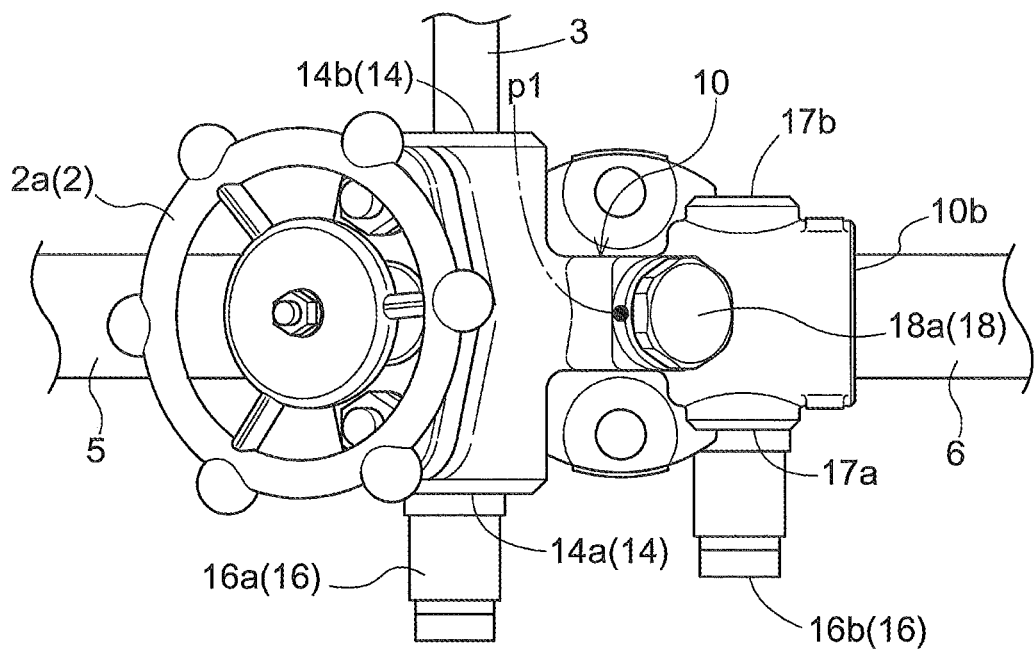
FIG. 5 is perspective view of the connection block which is vertically inverted.

The connection block 10 is configured to be attachable to the pipes 5, 6 even under a posture with the entrance-side pipe connection port 10a and the exit-side pipe connection port 10b being inverted left-right in their positions by upside-down inversion through rotation of the connection block 10 about the front-rear axis p1 extending perpendicularly to the pipes 5, 6. Thus, even if the positional relationship of the pipes 5, 6 is reversed as illustrated in FIG. 5 from that illustrated in FIG. 3, by attaching the connection block 10 to the pipes 5, 6 with upside-down inversion by its rotation about the front-rear axis p1 from the posture shown in FIG. 3, the state of the steam trap 1 being directed to the rear side and the operating portion 2a of the piston valve 2 being directed to the front side is maintained and at the same time a fluid passing direction of the straightener 18 is caused to agree to the fluid passing direction from the pipe 5.

Further, in case the position of the entrance side pipe connection port 10a and the position of the exit side pipe connection port 10b are inverted left and right by the upside-down inversion, the steam trap 1 is also attached to the trap attaching seat 11 of the connection block 10 with its upside-down inversion resulting from the rotation about the front-rear axis p1. With this, even in the event of left-right inversion by the upside-down inversion of the connection block 10, the steam trap 1 is placed under the same attaching posture as that shown in FIG. 2 and connected under such posture to the connection block 10.

And, the entrance-side dual-use attaching port 14b in the lower face portion of the connection bock 10 which portion becomes substantially the upper face portion as the result of upside-down inversion is used as a sensor attaching portion, and to its entrance-side dual-use attaching port 14b, the sensor attaching sheath pipe 15 is inserted from above and then into this sensor attaching sheath pipe 15, the sensor 3 is attached by insertion thereof from above. With this, as the sheath pipe 15 covers the surface of the sensor 3, deterioration of the sensor 3 due to its contact with fluid (steam and/or condensate) can be prevented.

As for the exit side dual-use attaching port 17b in the lower face portion of the connection block 10 which becomes substantially the upper face portion, this port 17b is closed by a plug or the like.

Also, the entrance-side and exit-side dual-use attaching ports 14a, 17a provided in the upper face portion of the connection block 10 which becomes substantially the lower face portion are used as blowdown valve attaching portions, so that the blowdown valves 16a, 16b are attached to these entrance-side and exit-side dual-use attaching ports 14a, 17a.

In this way, the connection block 10 is configured to be attachable to the pipes 5, 6 in a same manner even when the position of the entrance-side pipe connection port 10a and the position of the exit-side connection port 10b are inverted left and right by upside-down orientation inversion of the connection block 10. This arrangement can eliminate need to manufacture two kinds of connection blocks having the positions of their entrance-side pipe connection port 10a and exit-side pipe connection port 10b being inverted left and right from each other. Thus, there is achieved further advantage in terms of device cost.

Figure 6:
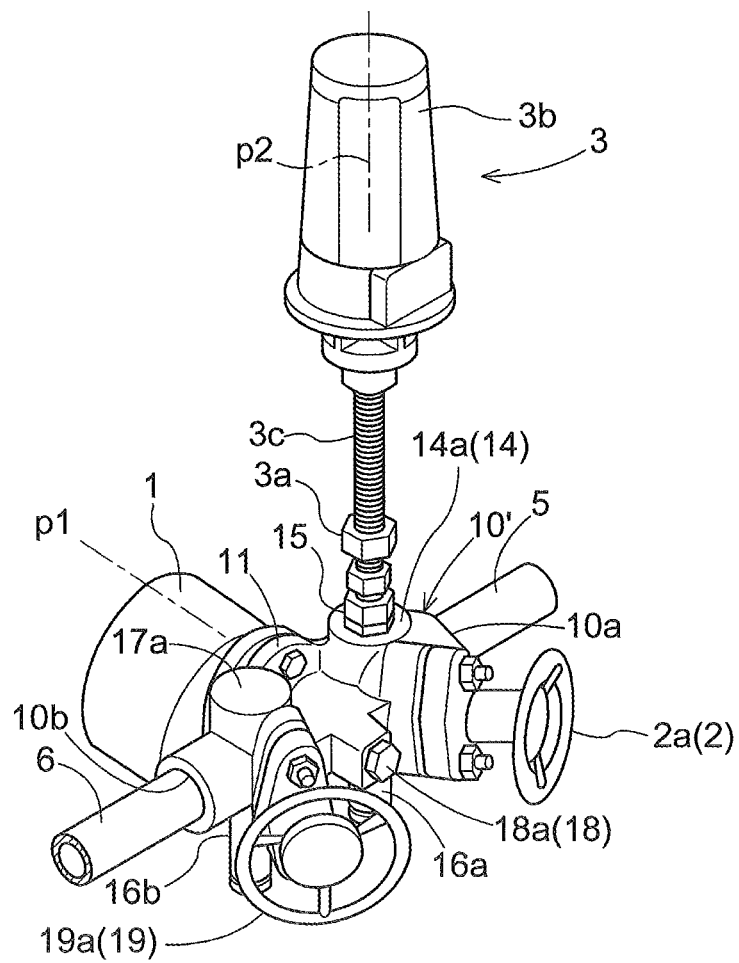
FIG. 6 is a perspective view of the connection block.
Figure 7:
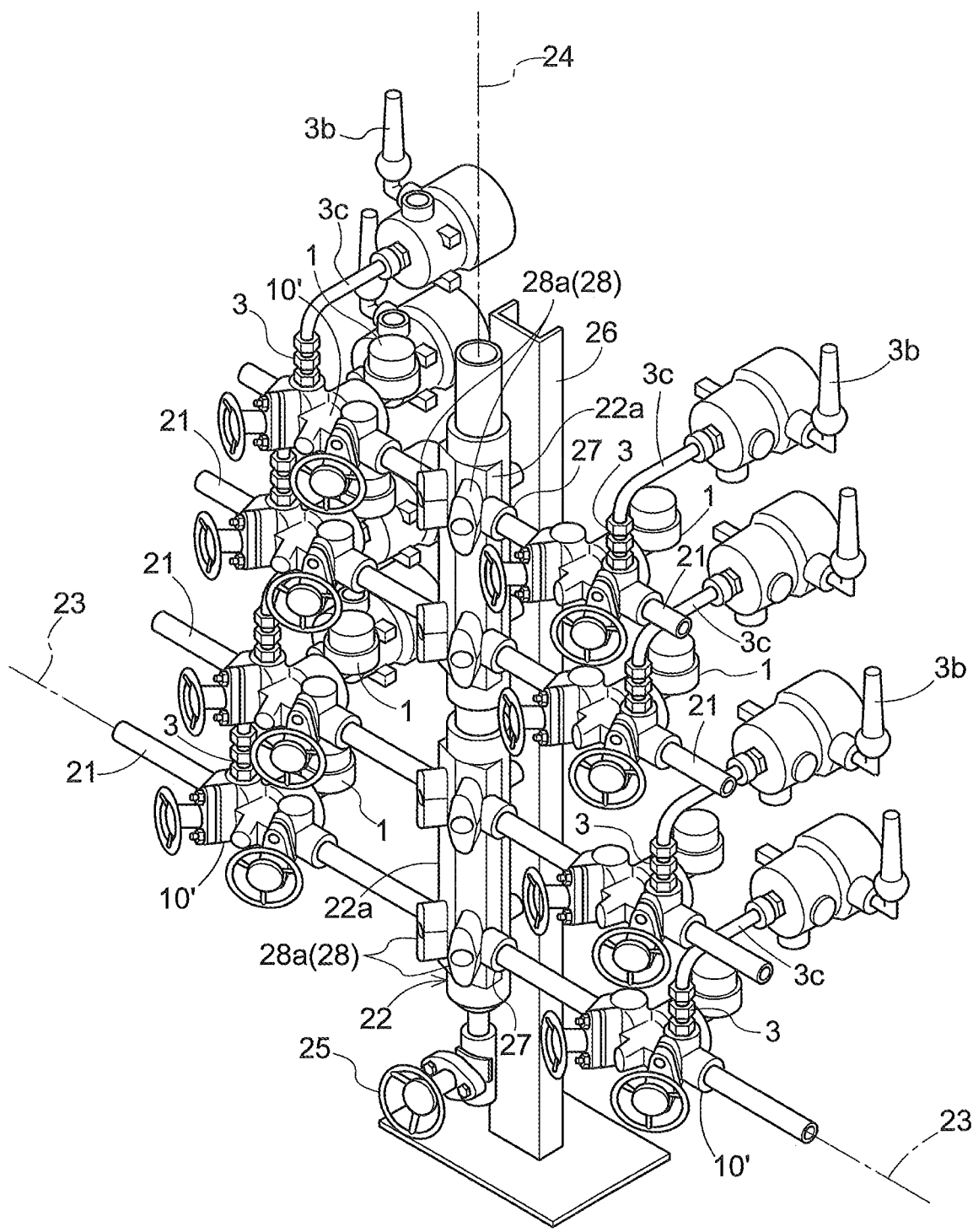
FIG. 7 is a perspective view of a pipe collection device.

Incidentally, the connection block for use in the steam trap monitoring system relating to this disclosure can be configured alternatively as a connection block 10' shown in FIG. 6 in which in addition to the piston valve 2, an exit-side piston valve (opening/closing valve) 19 for opening/closing the exit-side inner channel 13 is provided integrally with the connection block 10. In this connection block 10', operating portions 2a, 19a respectively of the entrance-side and exit-side piston valves 2, 19 are caused to project obliquely forwardly from the front face portion of the connection block 10' under a horizontal posture in a V-shaped layout in their plane view, with the portions 2a, 19a being the farther from each other, the more forward side. Further, the screen insertion/removal portion 18a of the straightener 18 is provided in the front face portion of the connection block 10' between the entrance-side piston valve 2 and the exit-side piston valve 19. Further, though not shown, the exit-side attaching ports 17a, 17b, as seen in their plane view, are disposed such that the center axis of the dual-use attaching ports 17a, 17b extends in the downstream vicinity of the piston valve 19. Incidentally, the rest of the configuration is identical to that of the foregoing connection block 10, so explanation thereof will be omitted herein.

This further connection block 10' too is configured to be attachable to the pipes 5, 6, under the posture with the position of the entrance-side pipe connection port 10a and the position of the exit-side pipe connection port 10b being inverted left and right with the upside-down inversion thereof by way of the rotation about the front-rear axis p1 extending perpendicularly to the pipes 5, 6. Therefore, even when the positional relationship of the pipes 5, 6 is reversed on the left and right, by attaching the connection block 10' to the pipes 5, 6 with the upside-down inversion by way of the rotation thereof about the front-rear axis p1, with the state of the steam trap 1 being directed to the rear side and the operating portions 2a, 19a of the piston valves 2, 19 being directed to the front side is maintained, and at the same time the fluid passing direction of the straightener 18 is caused to agree to the fluid passing direction from the pipe 5.

Further, like the foregoing connection block 10, in the case of the left-right inversion between the position of the entrance-side pipe connection port 10a and the position of the exit-side pipe connection port 10b by the upside-down inversion, the steam trap 1 too will be attached to the trap attaching seat 11 of the connection block 10', with the upside-down inversion by way of the rotation about the front-rear axis p1; and also the entrance-side attaching port 14b provided in the lower face portion of the connection block 10' which becomes substantially the upper face portion by the upside-down inversion is used as the sensor attaching portion, so that the sensor 3 is attached to this entrance-side attaching port 14b provided in the lower face portion. With these, the steam trap 1 and the sensor 3 can be connected under the same posture to the connection port 10'.

Next, analysis of a functional state of the steam trap 1 and a functional state of the piston valve 2 effected in the steam trap monitoring system of this disclosure will be explained.

The sensor 3 includes an insertion portion 3a for insertion to the sensor attaching portion 14 having unillustrated vibration sensor and temperature sensor, a communication portion 3b for transmitting detection information (temperature, vibration) to the analysis device 4, and a heat exchanger tube 3c interconnecting the insertion portion 3a and the communication portion 3b. As the sensor 3 is attached to the sensor attaching portion 14, the sensor 3 detects vibration propagating if any adjacent the steam trap 1 and the piston valve 2 and also detects temperature adjacent the steam trap 1 and the piston valve 2. And, detected detection information (temperature, vibration) is transmitted from the communication portion 3b to the analysis device 4.

The analysis device 4 analyzes both a functional state of the steam trap 1 and a functional state of the piston valve 2, based on the detected information transmitted from the respective sensor 3. In this steam trap monitoring system, for the two components, i.e. the steam trap 1 and the piston valve 2, one sensor 3 analyzes both the functional state of the steam trap 1 and the functional state of the piston valve 2.

More particularly, when the piston valve 2 is opened, vibration propagating in the vicinity of the steam trap 1 and the piston valve 2 and detected by the vibration sensor of the sensor 3 reflects mainly the functional state of the steam trap 1 (e.g. whether steam leaking is occurring or not). And, the temperature adjacent the steam trap 1 and the piston valve 2 detected by the temperature sensor of the sensor 3 reflects the temperature of the steam trap 1.

Based upon the above, when the piston valve 2 is at its opened state, if the temperature detected by the temperature sensor of the sensor 3 is below a predetermined temperature (that is, low-temperature abnormality), it is determined that clogging is occurring in the steam trap 1; and if vibration detected by the vibration sensor of the sensor 3 exceeds a predetermined value, it is determined that steam leak is occurring in the steam trap 1. Further, if the temperature detected by the temperature sensor of the sensor 3 is above the predetermined temperature and the vibration detected by the vibration sensor of the sensor 3 is below the predetermined value, it is determined that the steam trap 1 is operating normally. In this way, the functional state of the steam trap 1 is analyzed when the piston valve 2 is under its opened state.

Further, when the piston valve 2 is under its closed state, entry of steam into the steam trap 1 is stopped, so no vibration will occur from the steam trap 1 and no vibration will occur from the piston valve 2 either if this piston valve 2 effects its closing operation normally. But, if the piston valve 2 does not effect its closing operation normally, steam leak will occur in the piston valve 2, thus causing vibration due to this steam leak. Based on this, when the piston valve 2 is under its closed state, the functional state of the piston valve 2 (whether it is effecting the closing operation normally or not) is analyzed, based on presence/absence of vibration.

In this way, the functional states of both the steam trap 1 and the piston valve 2 are analyzed by the single sensor 3. Thus, as compared with an arrangement wherein sensors 3 are provided for both the steam trap 1 and the piston valve 2 for analysis of their respective functional states, the number of sensor(s) required is reduced and the device cost is reduced also. With this, the device structure is made simpler and the device cost is reduced. Moreover, communication trouble due to a large number of sensors is avoided.

Further, if the steam trap 1 and the piston valve 2 were disposed at separate locations via piping, this would require positioning the sensor 3 at a location that allows analysis of the functional state of the steam trap 1 and the functional state of the piston valve 2. On the other hand, in the present embodiment, by attaching the sensor 3 to the sensor attaching portion 14 formed in the connection block 10, it is readily possible to realize close-vicinity layout of the sensor 3 relative to the steam trap 1 and the piston valve 2, so that this sensor 3 can appropriately detect vibration/temperature reflecting the functional states of the steam trap 1 and the piston valve 2. As a result, both the functional state of the steam trap 1 and the functional state of the piston valve 2 can be analyzed more appropriate manner.

Second Embodiment

The steam trap monitoring system relating to this disclosure can be applied suitably also to a pipe collection device to be described next. FIGS. 7-10 show one example of such pipe collection device. In this pipe collection device 20, a plurality of horizontally oriented branch pipes (corresponding to a "pipe") 21 are disposed side by side in upside-down distribution and arranged in left-right symmetry relative to a vertically oriented main pipe 22, and respective one ends of these branch pipes 21 are connected to a main pipe 22 as a pipe header.

The main pipe 22 is disposed under a perpendicular posture (or substantially perpendicular posture) and the branch pipes 21 are disposed side by side and parallel with each other along the perpendicular direction (or substantially perpendicular direction).

Respective other ends of the branch pipes 21 (i.e. the ends opposite to the connecting side ends to the main pipe 22) are connected to a pipe channel 23 for guiding condensate that can mix with steam, e.g. a condensate discharge channel of a steam-using device. Each branch pipe 21 is mounted with a connection block 10' having the steam trap 1, the piston valves 2, 19 and the sensor 3.

Namely, with this pipe collection device 20, of mixture fluid of steam and condensate entering each branch pipe 21, the steam trap 1 prevents passage of steam thereof and allows condensate thereof alone to be collected in the main pipe 22. And, condensates collected in this main pipe 22 are returned from the upper end portion of the main pipe 22 via a return channel 24 to e.g. a boiler.

To a lower end portion of the main pipe 22, a blow valve 25 is connected. Thus, when needed e.g. at time of maintenance, this blow valve 25 will be opened to open the inside of the main pipe 22 to the atmosphere.

The main pipe 22 is connected to a strut 26 disposed erect on the floor and the whole device including the branch pipes 21, the connection blocks 10', etc. is supported by the strut 26.

Figure 8:
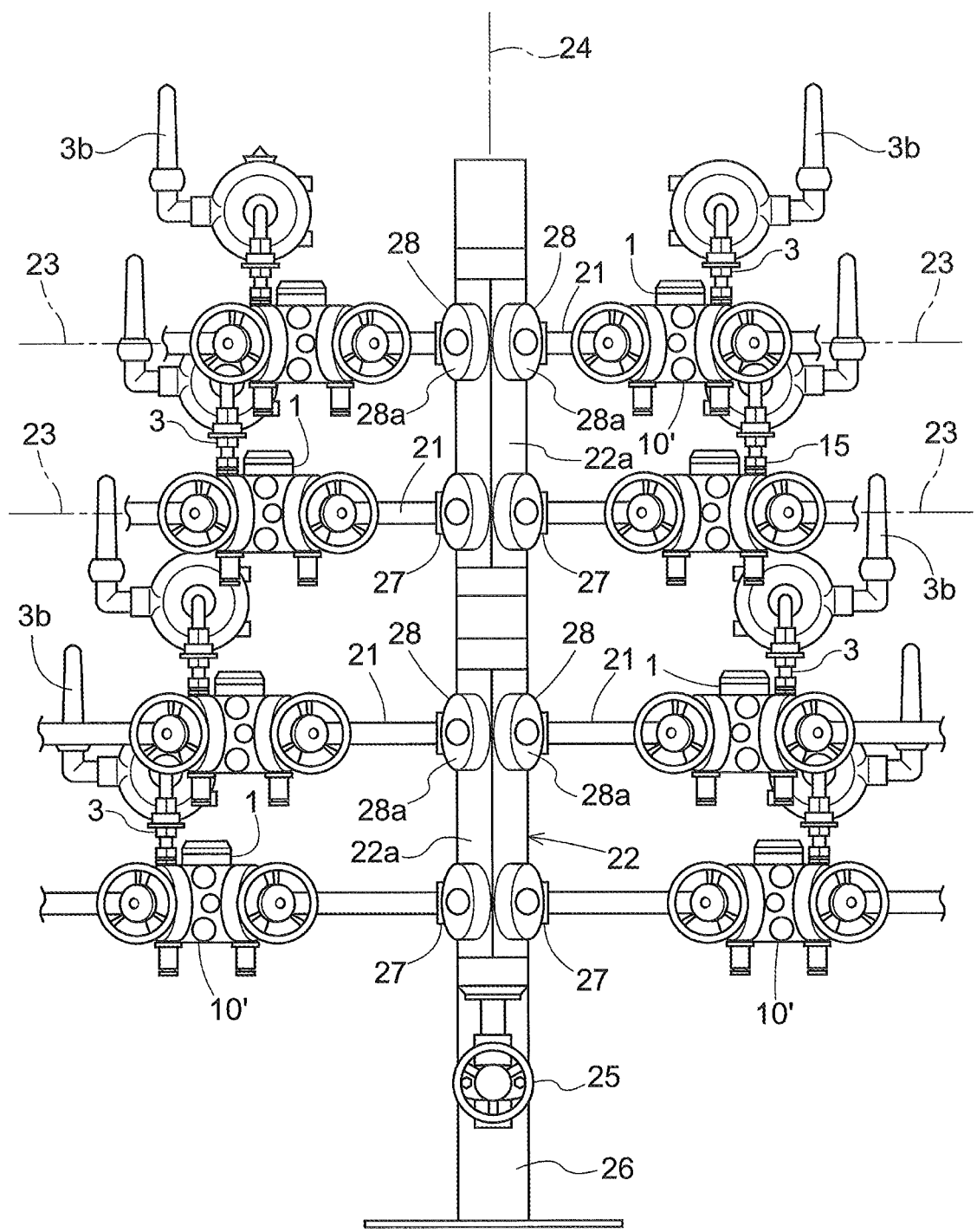
FIG. 8 is a front view of the pipe collection device.
Figure 9:
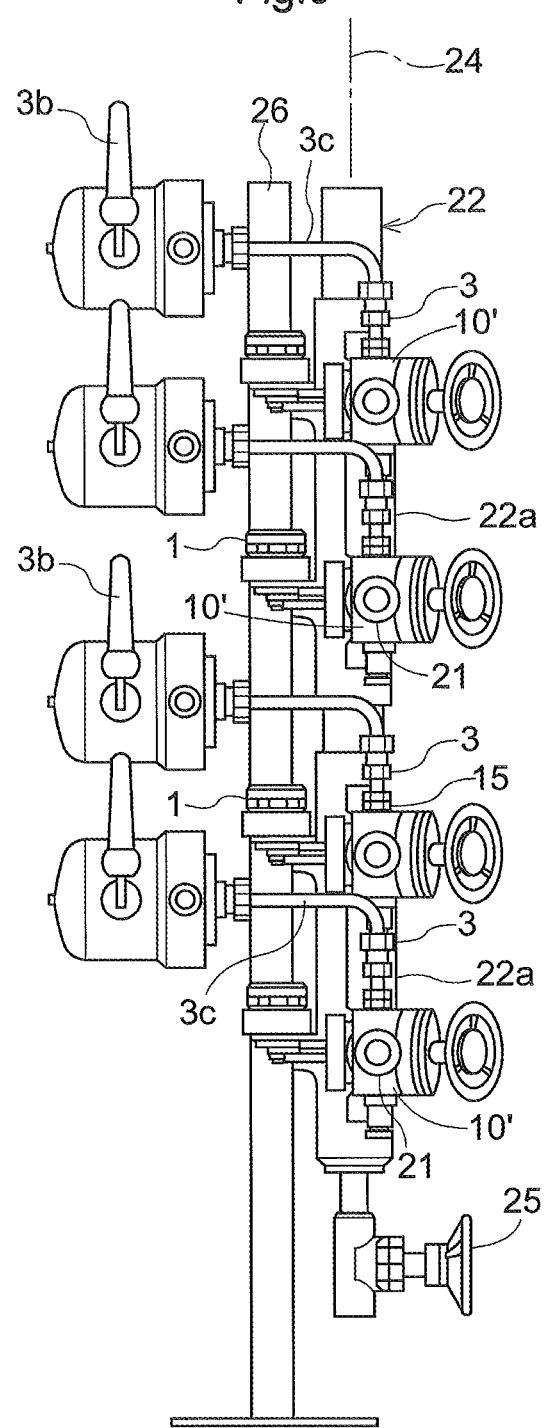
FIG. 9 is a side view of the pipe collection device.
Figure 10:
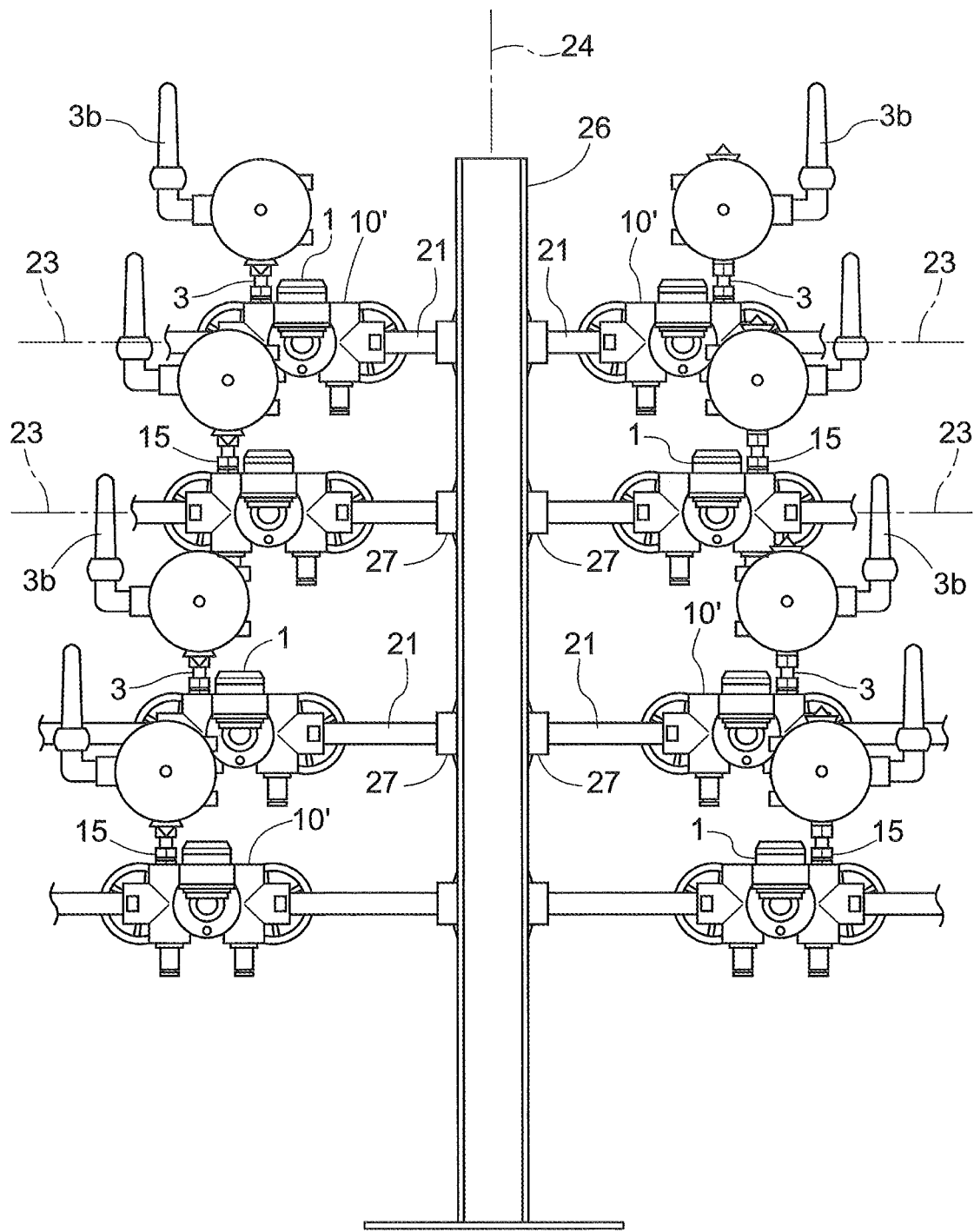
FIG. 10 is a rear view of the pipe collection device.

The connection bock 10' is configured to be attachable to the branch pipe 21 even when the block 10' is vertically inverted with its rotation about the front-rear axis p1 perpendicular to the branch pipe 21. In the FIG. 8 illustration, relative to the connection block 10' disposed on the left side (left side facing the plane of the illustration) of the main pipe 22 as a 'reference', the connection block 10' to be disposed on the right side (right side facing the plane of the illustration) of the main pipe 22 will be vertically inverted by its rotation about the front-rear axis p1 so as to direct the steam trap 1 to the rear side and direct the piston valves 2, 19 to the front side and the position of the entrance-side pipe connection port 10a and the position of the exit-side pipe connection port 10b are switched over left and right therebetween and under this state, the block 10' is attached to the branch pipe 21.

In short, the left side connection block 10' and the right side connection block 10' are designed to be used interchangeably in a same mode of attachment. With this arrangement, as compared with a case of manufacturing the connection block 10' for the left side and the connection block 10' for the right side separately for their respective dedicated uses, the device cost can be lower.

For the branch pipes 21 disposed along the perpendicular direction under the mutually parallel horizontal posture, the upper connection block 10' to be attached to the upper one of the branch pipes 21 adjacent each other vertically is attached to the branch pipe 21 with an offset toward the main pipe 22, relative to the lower connection block 10 to be attached to the lower branch pipe 21. With this arrangement, the sensor 3 provided in the upper branch pipe 21 (that is, the sensor 3 attached to the substantial upper face of the upper connection block 10') is attached to the upper branch pipe 21 in a layout retracted toward the main pipe 22 in the branch pipe longitudinal direction from the position immediately above.

Namely, the column of the sensors 3 attached to the left side connection blocks 10' and the column of the sensors 3 attached to the right side connection blocks 10' respectively form a part of the respective hypotenuse of an isosceles triangle as seen in a front view. Thus, as the upper sensor 3 is attached to the upper branch pipe 21 in the layout of being retracted from the position directly above the lower sensor 3, attaching operations of these sensors 3 and wire connecting operations to these sensors 3 are made easy and the vertical spacing between the branch pipes 21 is reduced correspondingly, thus forming the entire device compact in its height direction.

An electric cable pipe 3c of the sensor 3 attached to each connection block 10' is bent rearwards so as to avoid interference with the upper branch pipe 21. The sensor 3 detects not only vibration propagating adjacent the steam trap 1 and the piston valve 2, but also the temperature adjacent the steam trap 1 and the piston valve 2. And, detected detection information (temperature, vibration) is transmitted from the communication portion 3c to the analysis device (not shown), so that the analysis device analyzes both the functional state of the steam trap 1 and the functional state of the piston valve 2 in each collection block 10', based upon the detection information transmitted from the respective sensor 3.

In this way, for the two devices, i.e. the steam trap 1 and the piston valve 2, the functional state of the steam trap 1 and the functional state of the piston valve 2 are analyzed by the single sensor 3. Therefore, in the pipe collection device which tends to have a complicated device structure due to presence of not only pipes, but also the steam trap and the piston valve, etc. in close vicinity with each other, compared with the arrangement of providing sensors 3 to the steam trap 1 and the piston valve 2 respectively, the number of sensors required is reduced and the device structure is made correspondingly simpler.

The main pipe 22 is formed by joining a plurality of unit main pipes 22a, each unit main pipe 22a defining a pair of left and right branch pipe connection ports 27 disposed vertically side by side with a predetermined spacing therebetween, and defining also attaching seats 28 for opening/closing valves for opening/closing these branch pipe connection ports 27 individually.

Figure 11:
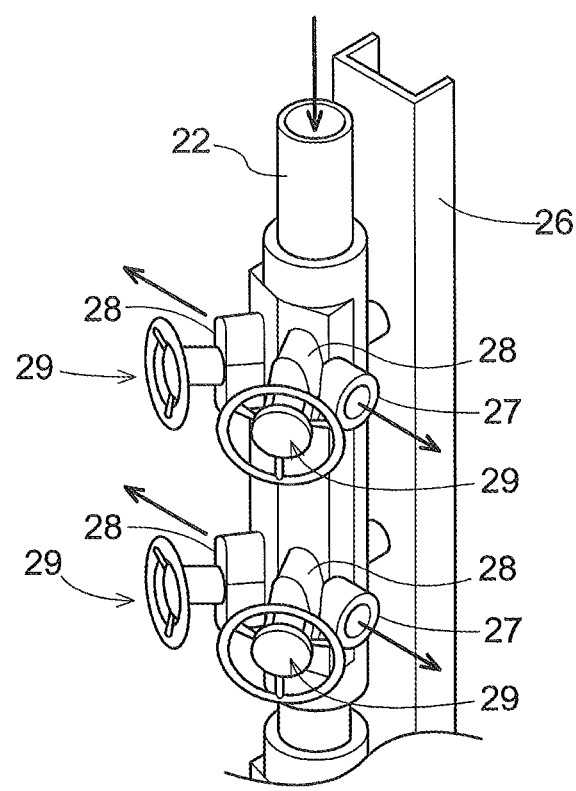
FIG. 11 is a perspective view illustrating an exemplary use of a main pipe as a distribution header.

Incidentally, in this embodiment, no opening/closing valves are attached to these attaching seats 28 and valve member insertion openings formed in the attaching seats 28 are closed by lid bodies 28a. However, as shown in FIG. 11 for instance, the main pipe 22 can be used also as a distribution header for distributing fluid to the plurality of branch pipes 21 connected to this main pipe 22. In such case, distribution of fluid to the respective branch pipe 21 is allowed/blocked by opening/closing the opening/closing valve 29 attached to the attaching seat 28 described above.

Further Embodiments

Next, further embodiments of this disclosure will be recited one by one.

In the first and second embodiments described above, the detection information detected by the sensor 3 is transmitted from the communication portion 3b to the analysis device 4 provided separately from the sensor 3, and this analysis device 4 analyzes both a functional state of the steam trap 1 and a functional state of the piston valve 2, based on the detection information transmitted from the sensor 3. However, the disclosure is not limited thereto. Alternatively, an analysis device may be provided in the sensor 3, so that the communication portion 3b of the sensor 3 transmits analysis result of the analysis device to a host computer. Further alternatively, the sensor 3 may be provided with a reporting portion for reporting analysis result provided by the analysis device to the periphery of the sensor 3.

Figure 12:
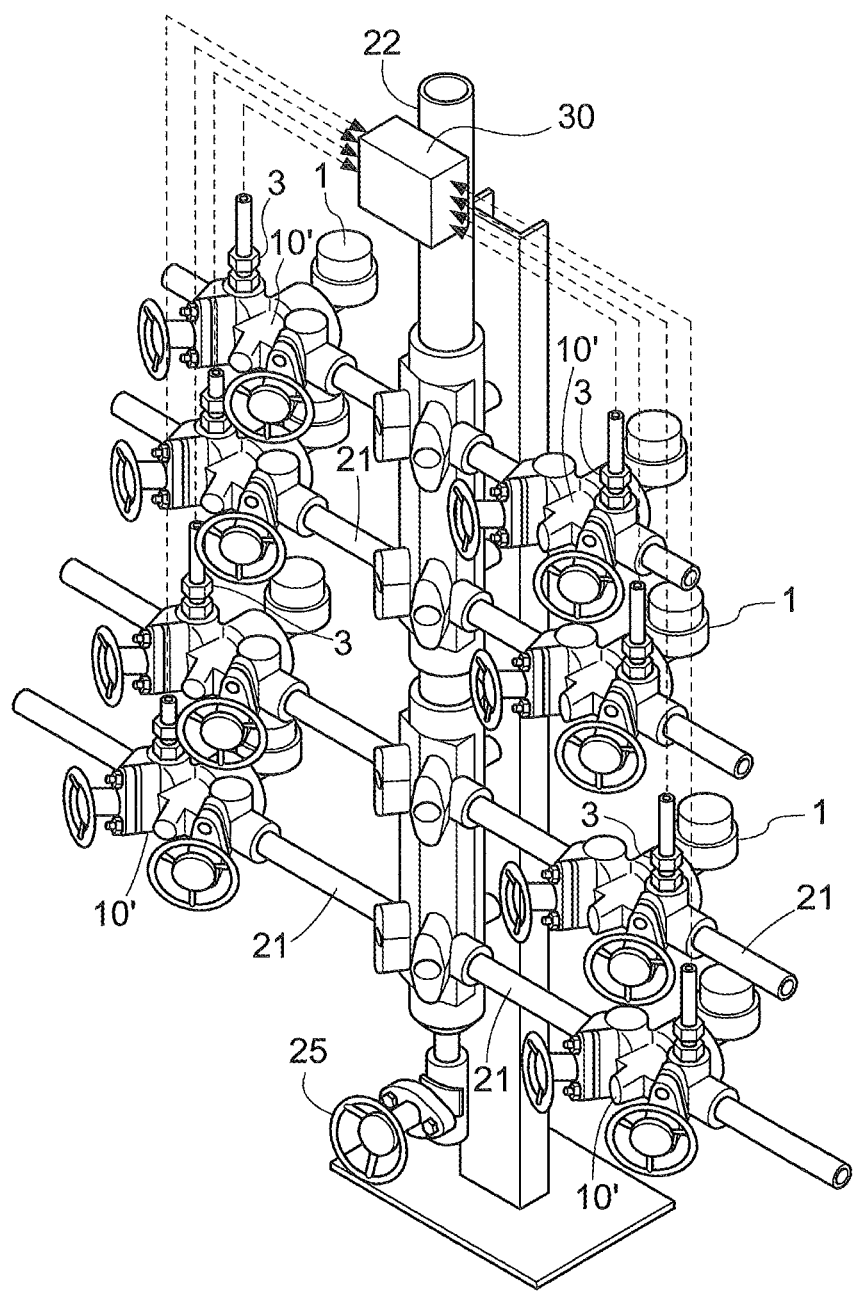
FIG. 12 is a perspective view showing a further embodiment.

In the second embodiment described above, there was shown the example in which detection information of each sensor 3 is transmitted individually from the communication portion 3b to the analysis device 4. Instead of this, as shown in FIG. 12, a common monitoring unit 30 for processing detection information of the respective sensors 3 comprehensively may be provided at an appropriate location, such as at the upper end portion of the main pipe 22. And, this common monitoring unit 30 may be provided with a transmission portion for wirelessly transmitting detection information of each sensor 3 to the analysis device 4, an analysis portion for analyzing a functional state of the steam trap 1 and a functional state of the piston valve 2 in each collection block 10' based on the detection information of each sensor 3, and so on.

Figure 13:
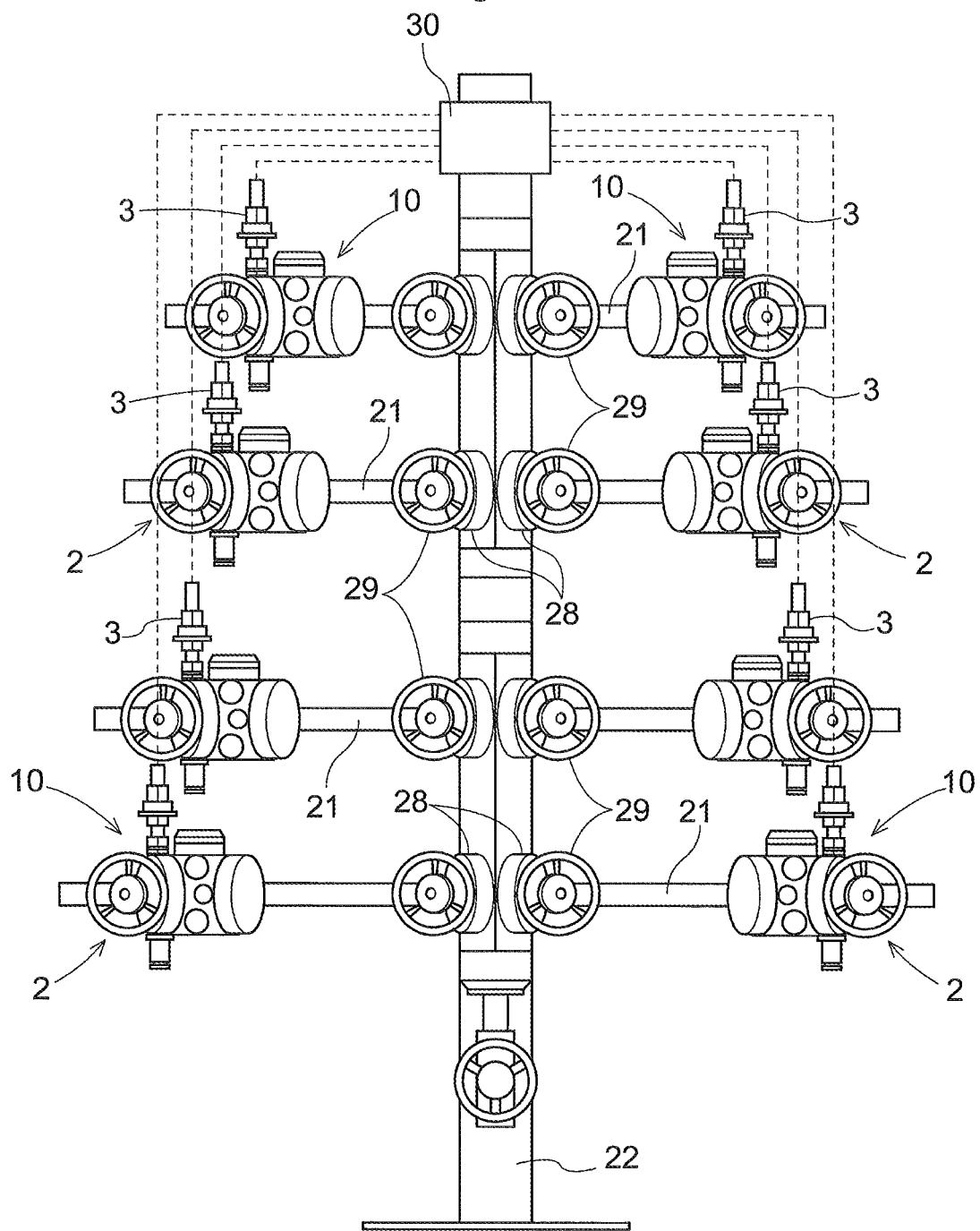
FIG. 13 is a front view showing a further embodiment.

In the second embodiment described above, there was shown the example using the connection block 10' having the entrance-side and exit-side piston valves 2, 19. Instead of this, as shown in FIG. 13, a connection block 10 having only the entrance-side piston valve 2 may be used and instead of the exit-side piston valve 19, an opening/closing valve 29 may be attached to an opening/closing valve attaching seat 28 of the main pipe 22.

In the first and second embodiments described above, there was shown the example in which the sensor 3 is provided with a vibration sensor and a temperature sensor. The disclosure is not limited thereto. Other kinds of sensors such as a pressure sensor and a sound sensor, can be provided as long as they are capable of analyzing a functional state of the steam trap and a functional state of the opening/closing valve. Further alternatively, only kind of sensor alone can be provided, or three or more kinds of sensors can be provided.

In the first and second embodiments described above, the connection block 10, the steam trap 1, the piston valve 2 and the sensor 3 together constitute a single unit, or the connection block 10', the steam trap 1, the piston valves 2, 19 and the sensor 3 together constitute a single unit. However, the disclosure is not limited thereto. Alternatively, the steam trap 1 or the piston valves 2, 19 may be attached individually to pipes and the sensor 3 may be disposed at an appropriate location in the vicinity of the steam trap 1 and the piston valve 2, so that the functional state of the steam trap and the functional state of the piston valve may be analyzed based on detection information from the sensor 3.

In the first and second embodiments described above, the entrance-side dual-use attaching port 14a, 14b of the connection block 10, 10' is configured to be communicated to the entrance-side inner channel 12 of the connection block 10, 10', and as the sheath pipe 15 covers the surface of the sensor 3, deterioration of the sensor 3 due to its contact with fluid is prevented. However, the disclosure is not limited thereto. Alternatively, the dual-use attaching port 14a, 14b may be configured not to provide communication from the surface of the connection block to the inner channel of the connection block to keep the inserted sensor 3 out of contact with the fluid flowing in the entrance side inner channel 12 of the connection block 10, 10', thereby preventing deterioration of the sensor 3 due to its contact with the fluid.

Reference Embodiment

Figure 14:
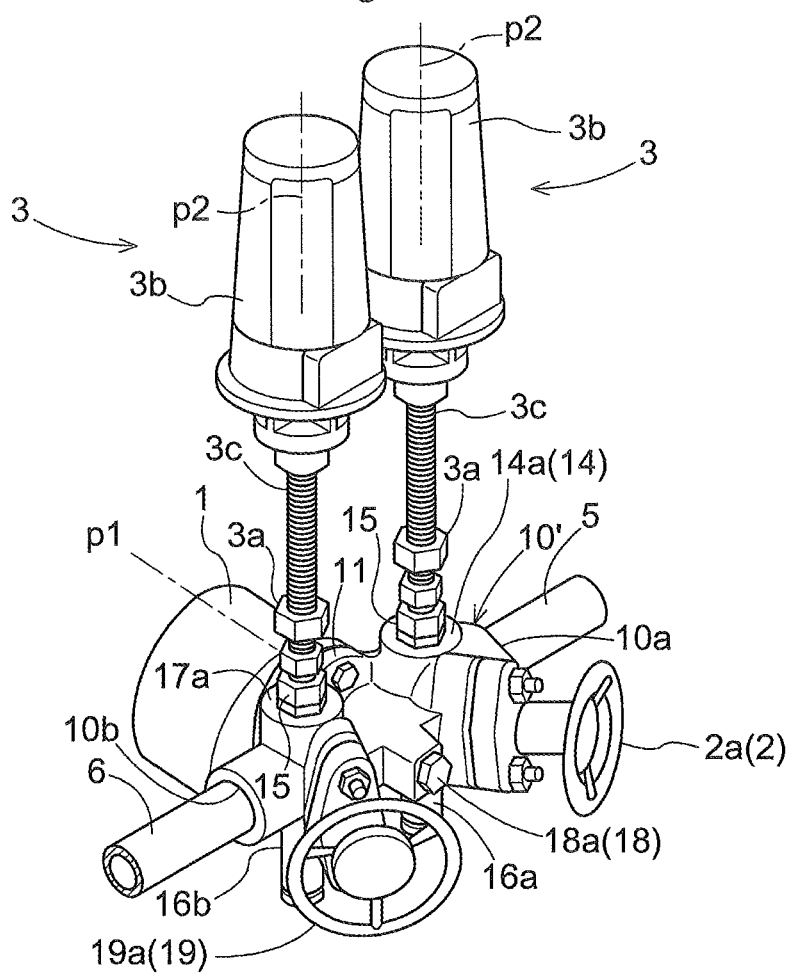
FIG. 14 is a perspective view showing a reference mode of embodiment.

Incidentally, an arrangement as follows will be disclosed only as a 'reference example' since it is understood that this is out of the essential concept of the present disclosure characterized in that a single sensor analyzes both a functional state of a steam trap and a functional state of an opening/closing valve. As shown in FIG. 14, in addition to the attachment of the sensor 3 to the dual-use attaching port 14a, 14b as the sensor attaching portion 14, relative to the connection block 10' having the entrance-side and exit-side opening/closing valves 2, 19, it is conceivable to attach the sensor 3 to the dual-use attaching port 17a, 17b (shown as the dual-use attaching port 17a in FIG. 14) as the sensor attaching portion. Incidentally, for the connection block 10 having only the entrance-side opening/closing valve 2, it is conceivable to attach the sensor 3 to the dual-use attaching port 17a, 17b also as the sensor attaching portion.

With the attachment of the sensor 3 on the downstream side of the steam trap 1 additionally as described above, by e.g. obtaining average of vibrations detected by the two sensors, one being on the upstream side, the other being on the downstream side, vibration attributable to the steam trap 1 can be detected in an even more accurate manner. Further, if steam leak occurs in the steam trap 1, there will result in a phenomenon that the temperature upstream the steam trap 1 becomes equal to the temperature downstream the steam trap 1. In this regard, as both temperatures, i.e. the upstream side temperature and the downstream side temperature, can be detected by the two sensors 3, occurrence of steam leak in the steam trap 1 can be detected based on a temperature difference between the temperatures detected by the two sensors. With this, diagnosis of steam leak of the steam trap 1 is made possible from the both respects of vibration and temperature, so that the functional state of the steam trap can be analyzed in an even more accurate manner.

Incidentally, in the case of the left and right switchover between the position of the entrance-side pipe connection port 10a and the position of the exit-side pipe connection port 10b by the upside-down orientation inversion, as for the sensor 3 too, by attaching the sensor 3 to the exit-side dual-use attaching port 17b in the lower face with using, as the sensor attaching portion, the exit-side dual-use attaching port 17b in the lower face portion of the connection block 10' which becomes substantially the upper face portion as result of the upside-down orientation inversion, the sensor 3 to be attached to the dual-use attaching port 17a, 17b too can be connected to the collection block 10' under a same posture.

INDUSTRIAL APPLICABILITY

The steam trap monitoring system according to this disclosure can be applied to a variety of uses in various fields that require monitoring of a steam trap and an opening/closing valve.

DESCRIPTION OF REFERENCE MARKS/NUMERALS

1: steam trap
2, 19: opening/closing valve
2a, 19a: operating portion
3: sensor
4: analysis device (analysis unit)
5, 6: pipe
10, 10': connection block
10a: entrance-side pipe connection port
10b: exit-side pipe connection port
12: entrance-side inner channel
13: exit-side inner channel
14: sensor attaching portion
14a: dual-use attaching port (upper face side sensor attaching portion)
14b: dual-use attaching port (lower face side sensor attaching portion)
15: sheath pipe (cover)
16a, 16b: blowdown valve
20: pipe collection device
p1: front-rear axis

The invention claimed is:
1. A steam trap monitoring system comprising:
a steam trap;
an opening/closing valve disposed on an upstream side of the steam trap and configured to open/close a channel to the steam trap;
a sensor for detecting one or more physical quantities: and
an analysis unit for analyzing detection information from the sensor;
wherein the sensor comprises a vibration sensor for detecting vibration that propagates adjacent the steam trap and the opening/closing valve;
wherein the analysis unit is configured to analyze both a functional state of the steam trap and a functional state of the opening/closing valve, based on the detection information from the single sensor; and
wherein:
the steam trap is connected to a connection block having an entrance-side pipe connection port and an exit-side pipe connection port which are open in opposite directions from each other, in such a manner that the steam trap is communicated to the entrance-side connection port and the exit-side connection port via an entrance-side inner channel and an exit-side inner channel formed in this connection block;
the opening/closing valve is provided in the connection block in such a manner to be able to open/close the entrance-side inner channel formed in the connection block;
the sensor is provided in the connection block on an upstream side of the steam trap; and
the connection block, the steam trap, the opening/closing valve and the sensor, together constitute a single unit, and
wherein:
the connection block is configured to be attachable to a pipe to be installed under a posture with the entrance-side pipe connection port and the exit-side pipe connection port being inverted left and right in their positions by upside-down inversion through rotation of the connection block about a front-rear axis extending perpendicularly to the pipe;
the opening/closing valve has an operating portion disposed at a front face portion of the connection block;
a sensor attaching portion for attachment of the sensor by insertion thereof including an upper face side sensor attaching part provided in the upper face portion of the connection block and a lower face side sensor attaching part provided in a lower face portion of the connection block is provided on an upstream side of the steam trap in the connection block; and for the connection block that is attached to the pipe without the upside-down inversion, the sensor is attached to the upper face side sensor attaching part, whereas for the connection block that is attached to the pipe with the upside-down inversion, the sensor is attached to the lower face side sensor attaching part.

2. The steam trap monitoring system of claim 1, wherein the sensor further comprises a temperature sensor.

3. The steam trap monitoring system of claim 1, wherein:
the sensor attaching portion is configured to establish communication from a surface of the connection block to an inner channel of the connection block; and
a cover is provided at an insertion portion of the sensor to the sensor attaching portion, so that the sensor, when inserted, keeps out of contact with fluid flowing in the inner channel of the connection block.

4. The steam trap monitoring system of claim 3, wherein:
for the connection block which is attached to the pipe without the upside-down inversion, a blowdown valve for opening the inside of the connection block to the atmosphere is attached to the lower face side sensor attaching part; and
for the connection block which attached to the pipe with the upside-down inversion, the blowdown valve is attached to the upper face side sensor attaching part.

5. The steam trap monitoring system of claim 1, wherein:
the sensor attaching portion is configured to not establish communication from a surface of the connection block to an inner channel of the connection block, to keep the sensor, when inserted, out of contact with fluid flowing in the inner channel of the connection block.

6. The steam trap monitoring system of claim 1, wherein in addition to the opening/closing valve, there is provided an exit-side opening/closing valve disposed on a downstream side of the steam trap and configured to open/close the channel to the steam trap.

7. A pipe collection device in which a plurality of horizontally oriented branch pipes are connected to a vertically oriented main pipe, with the branch pipes being connected parallel with each other and distributed vertically;
wherein the steam trap monitoring system of claim 1 is applied to each of the branch pipes.

8. The steam trap monitoring system of claim 2, wherein:
the steam trap is connected to a connection block having an entrance-side pipe connection port and an exit-side pipe connection port which are open in opposite directions from each other, in such a manner that the steam trap is communicated to the entrance-side connection port and the exit-side connection port via an entrance-side inner channel and an exit-side inner channel formed in this connection block;
the opening/closing valve is provided in the connection block in such a manner to be able to open/close the entrance-side inner channel formed in the connection block;
the sensor is provided in the connection block on an upstream side of the steam trap; and
the connection block, the steam trap, the opening/closing valve and the sensor, together constitute a single unit.

9. The steam trap monitoring system of claim 2, wherein in addition to the opening/closing valve, there is provided an exit-side opening/closing valve disposed on a downstream side of the steam trap and configured to open/close the channel to the steam trap.

10. The steam trap monitoring system of claim 3, wherein in addition to the opening/closing valve, there is provided an exit-side opening/closing valve disposed on a downstream side of the steam trap and configured to open/close the channel to the steam trap.

11. The steam trap monitoring system of claim 4, wherein in addition to the opening/closing valve, there is provided an exit-side opening/closing valve disposed on a downstream side of the steam trap and configured to open/close the channel to the steam trap.

12. The steam trap monitoring system of claim 5, wherein in addition to the opening/closing valve, there is provided an exit-side opening/closing valve disposed on a downstream side of the steam trap and configured to open/close the channel to the steam trap.

13. The steam trap monitoring system of claim 8, wherein in addition to the opening/closing valve, there is provided an exit-side opening/closing valve disposed on a downstream side of the steam trap and configured to open/close the channel to the steam trap.

14. A steam trap unit comprising:
a steam trap;
a connection block having an entrance-side pipe connection port and an exit-side pipe connection port which are open in opposite directions from each other;
an opening/closing valve configured to open/close a channel to the steam trap; and
a sensor for detecting one or more physical quantities:
wherein the steam trap is connected to the connection block in such a manner that the steam trap is communicated to the entrance-side connection port and the exit-side connection port via an entrance-side inner channel and an exit-side inner channel formed in this connection block;
the opening/closing valve is provided in the connection block in such a manner to be able to open/close the entrance-side inner channel formed in the connection block; and
the sensor is provided in the connection block on an upstream side of the steam trap
wherein:
the connection block is configured to be attachable to a pipe to be installed under a posture with the entrance-side pipe connection port and the exit-side pipe connection port being inverted left and right in their positions by upside-down inversion through rotation of the connection block about a front-rear axis extending perpendicularly to the pipe;
the opening/closing valve has an operating portion disposed at a front face portion of the connection block;
a sensor attaching portion for attachment of the sensor by insertion thereof including an upper face side sensor attaching part provided in the upper face portion of the connection block and a lower face side sensor attaching part provided in a lower face portion of the connection block is provided on an upstream side of the steam trap in the connection block; and
for the connection block that is attached to the pipe without the upside-down inversion, the sensor is attached to the upper face side sensor attaching part, whereas for the connection block that is attached to the pipe with the upside-down inversion, the sensor is attached to the lower face side sensor attaching part.

* * * * *

UNITED STATES PATENT AND TRADEMARK OFFICE
CERTIFICATE OF CORRECTION

PATENT NO. : 10,605,408 B2
APPLICATION NO. : 15/517743
DATED : March 31, 2020
INVENTOR(S) : Tadashi Oike It is certified that error appears in the above-identified patent and that said Letters Patent is hereby corrected as shown below:

In the Claims

Column 16, Line 23, Claim 1, delete "quantities:" and insert -- quantities; --

Column 17, Line 23, Claim 4, after "which" insert -- is --

Signed and Sealed this
Second Day of June, 2020

Andrei Iancu
*Director of the United States Patent and Trademark Office*